United States Patent
Otto

(10) Patent No.: US 9,573,773 B2
(45) Date of Patent: Feb. 21, 2017

(54) CONVEYOR FOR TRANSPORTING OBJECTS

(71) Applicant: SDI Group Germany Material Handling Solutions GmbH, Bielefeld (DE)

(72) Inventor: Thomas Otto, Bielefeld (DE)

(73) Assignee: SDI GROUP GERMANY MATERIAL HANDLING SOLUTIONS GMBH, Bielefeld (DE)

(*) Notice: Subject to any disclaimer, the term of this patent is extended or adjusted under 35 U.S.C. 154(b) by 0 days.

(21) Appl. No.: 14/857,388

(22) Filed: Sep. 17, 2015

(65) Prior Publication Data
US 2016/0083197 A1    Mar. 24, 2016

(30) Foreign Application Priority Data
Sep. 18, 2014    (EP) .................................... 14185396

(51) Int. Cl.
| B65G 29/00 | (2006.01) |
| B65G 47/84 | (2006.01) |
| B65G 17/06 | (2006.01) |
| B65G 17/22 | (2006.01) |
| B65G 17/38 | (2006.01) |
| B65G 17/44 | (2006.01) |

(52) U.S. Cl.
CPC .......... *B65G 47/844* (2013.01); *B65G 17/066* (2013.01); *B65G 17/22* (2013.01); *B65G 17/38* (2013.01); *B65G 17/44* (2013.01)

(58) Field of Classification Search
CPC ....... B65G 17/22; B65G 17/066; B65G 17/38; B65G 17/44; B65G 17/12; B65G 17/123; B65G 17/14

USPC .................. 198/477.1, 370.02, 463.1, 465.1, 465.2, 198/793, 867.14, 867.15, 345.1, 345.2
See application file for complete search history.

(56) References Cited

U.S. PATENT DOCUMENTS

| 2,057,950 A * | 10/1936 | Howison .............. B65G 39/20 198/838 |
| 2,611,473 A * | 9/1952 | Reynolds ................. C21D 9/32 198/803.14 |
| 3,926,489 A * | 12/1975 | Futch ...................... A47F 10/06 186/45 |
| 4,128,163 A * | 12/1978 | Rana ...................... B65G 17/32 198/370.02 |
| 4,149,620 A * | 4/1979 | Rosensweig ........... B23Q 7/035 198/345.2 |
| 5,154,273 A * | 10/1992 | Macomber ........... B65G 17/066 198/321 |

(Continued)

FOREIGN PATENT DOCUMENTS

| DE | 199 59 843 | 6/2001 |
| EP | 2 159 174 | 3/2010 |

*Primary Examiner* — William R Harp
(74) *Attorney, Agent, or Firm* — Henry M. Feiereisen LLC

(57) ABSTRACT

A conveyor for transporting objects includes a rail arrangement which includes a first rail track and a second rail track extending parallel to the first rail track; coupling elements guided in the second rail track and drivable with a drive device along the second rail track; and plural deposit tables for receiving the objects thereon, with at least two of the deposit tables being fastened on each of the coupling elements and slidingly or rollingly supported on the first rail track, each of said deposit tables having a pusher which is movable transversely to a transport direction of the deposit tables for pushing the objects off the deposit tables.

15 Claims, 10 Drawing Sheets

(56) References Cited

U.S. PATENT DOCUMENTS 9,242,806 B2 * 1/2016 Hopman .............. B65G 47/844

* cited by examiner

CONVEYOR FOR TRANSPORTING OBJECTS

CROSS-REFERENCES TO RELATED APPLICATIONS

This application claims the priority of European Patent Application, Serial No. 14 185 396.0, filed Sep. 18, 2014, pursuant to 35 U.S.C. 119(a)-(d), the disclosure of which is incorporated herein by reference.

BACKGROUND OF THE INVENTION

The present invention relates to a relates to a conveyor for transporting objects.

The following discussion of related art is provided to assist the reader in understanding the advantages of the invention, and is not to be construed as an admission that this related art is prior art to this invention.

Such conveyors are used in particular for transporting packages and other objects, which rest on respective deposit tables of the conveyor and are transported on the deposit tables along a transport path up to an unloading station. As soon as the unloading station is reached, a pusher, which can be moved perpendicular to the transport direction on the respective deposit tables, serves for pushing the object to be transported from the deposit table to the unloading station.

Such conveyors are for example known from DE 109 598 43 A1 or EP 2 159 174 B1.

While the capacity of the conveyor according to DE 109 598 43 A1 is limited by the width of the individual deposit tables, two pushers are provided on each of the deposit tables according to EP 2 159 174 B1, so that on such a table a larger or optionally also two smaller objects can be transported, which are pushed off separate from each other by the respective pushers, which however has the disadvantage that, due to the length of the individual deposit tables in transport direction of the transport path, curve sections have to be configured with a relatively great curve radius.

It would therefore be desirable and advantageous to provide an improved conveyor for transporting objects, which has a high capacity and can also move through curves of the transport path that have a relatively small curve radius.

SUMMARY OF THE INVENTION

According to one aspect of the present invention, a conveyor for transporting objects includes a rail arrangement which includes a first rail track and a second rail track extending parallel to the first rail track; coupling elements guided in the second rail track and drivable with a drive device along the second rail track; and plural deposit tables for receiving the objects thereon, with at least two of the deposit tables being fastened on each of the coupling elements and slidingly or rollingly supported on the first rail track, each of said deposit tables having a pusher which is movable transversely to a transport direction of the deposit tables for pushing the objects off the deposit tables. The drive device can for example be a friction free drive.

Fastening of at least two of the deposit tables on each of the coupling elements makes it possible that also objects such a packages or the like that have a longitudinal extent, which exceeds the width of the deposit tables in transport direction, can be transported with such a conveyor.

According to an advantageous embodiment of the invention each of the coupling elements has a holding part which is movably held on the second rail track, and on which at least two of the deposit tables are fastened.

The deposit tables are hereby preferably fastened elastically on the holding part. For this, preferably elastically deformable connecting elements are used, which are preferably formed by two bolts that are connected by a cushion, which is made of an elastic material, and which are held in respective bores of the deposit tables and the coupling elements.

This makes it possible that the deposit tables can be moved out of the horizontal plane if needed and can thus be slightly lifted in the region of a curve of the transport path by elevating the first rail track. This makes it possible to increase the speed of the tables along the transport path without the risk that the objects that are transported on the tables slide off the tables in the curve region due to centrifugal force.

Thus according to a further preferred embodiment of the conveyor according to the invention, the first rail track is configured in the region of a curve of the rail arrangement as outer track with a greater curvature radius than the curvature radius of the second rail track, which is configured as inner track. A support surface of the first rail track is hereby configured elevated in the region of the curve relative to a straight region of the transport path.

Instead of the elevation of the first rail track a lowering of the second rail track is also conceivable.

According to a further preferred embodiment, each of the coupling elements has pressing surfaces for driving the tables along the transport path, which pressing surfaces can be pushed against the electrically driven friction rollers for driving the coupling elements. These pressing surfaces are preferably formed on webs, which are fastened or molded below the holding part, wherein the pressing surfaces extend vertically and parallel to the transport direction.

By means of such webs arranged on the coupling elements it is possible in a simple manner to arranged the electrically driven friction rollers below the support surface of the deposit tables.

According to a further preferred embodiment of the conveyor according to the invention, a gap between adjacent borders of two deposit tables fastened on one of the coupling elements is at least partially covered by a protective cover, which is fastened on one of the borders.

This has the advantage that on one hand no objects placed on the deposit table can slide off the deposit table through this gap. The protective cover is preferably configured as a brush, wherein particularly preferably such a brush is provided on both neighboring borders of the deposit table fastened on one of the coupling elements.

In order to ensure a predetermined distance between the individual coupling elements on which the deposit tables are fastened, according to a further advantageous embodiment at least one spacer element is respectively arranged in the second rail track between neighboring coupling elements with deposit tables fastened thereon.

According to a further preferred embodiment of the conveyor according to the invention, each of the coupling elements has at least one guide element with running wheels and guide wheels respectively guided in tracks of a hollow section of the two rail tracks.

The guide element is preferably formed by a head part with a first bearing housing on which the running wheels and guide wheels are rotatably supported, and a foot part arranged on the head part so as to be pivotal about an angle α and having a second bearing housing on which the guide wheels are rotatably supported and on which a guide bolt extends downward from a bottom side which faces away from the head part, on which guide bolt the holding part is fastened.

Also the configuration of the guide element makes a pivoting of the deposit tables in the region of the curve of the first rail track possible in a simple manner.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 a perspective view of an embodiment of the conveyor according to the invention, FIGS. 2 and 3 respective perspective views of deposit tables fastened on a coupling element, FIG. 4 a partial exploded view of the deposit tables and the coupling element and the deposit element, FIGS. 5a and 5b two tables fastenable on one of the coupling elements in an assembled or disassembled state, with a cover arranged between the tables, FIG. 6 a top view onto a curve section of the conveyor shown in FIG. 1, FIG. 7 a sectional view through the sectional plane of FIG. 6 designated VII, FIG. 8 a detail view of the section of FIG. 7 designated VIII, FIG. 9 a perspective view of an embodiment of a connecting element connecting the deposit tables with the coupling element, FIG. 10a a perspective view of an embodiment of a coupling element, and FIG. 10b a front view onto the embodiment of the coupling element shown in FIG. 10a.

DETAILED DESCRIPTION OF PREFERRED EMBODIMENTS

Figure 1:
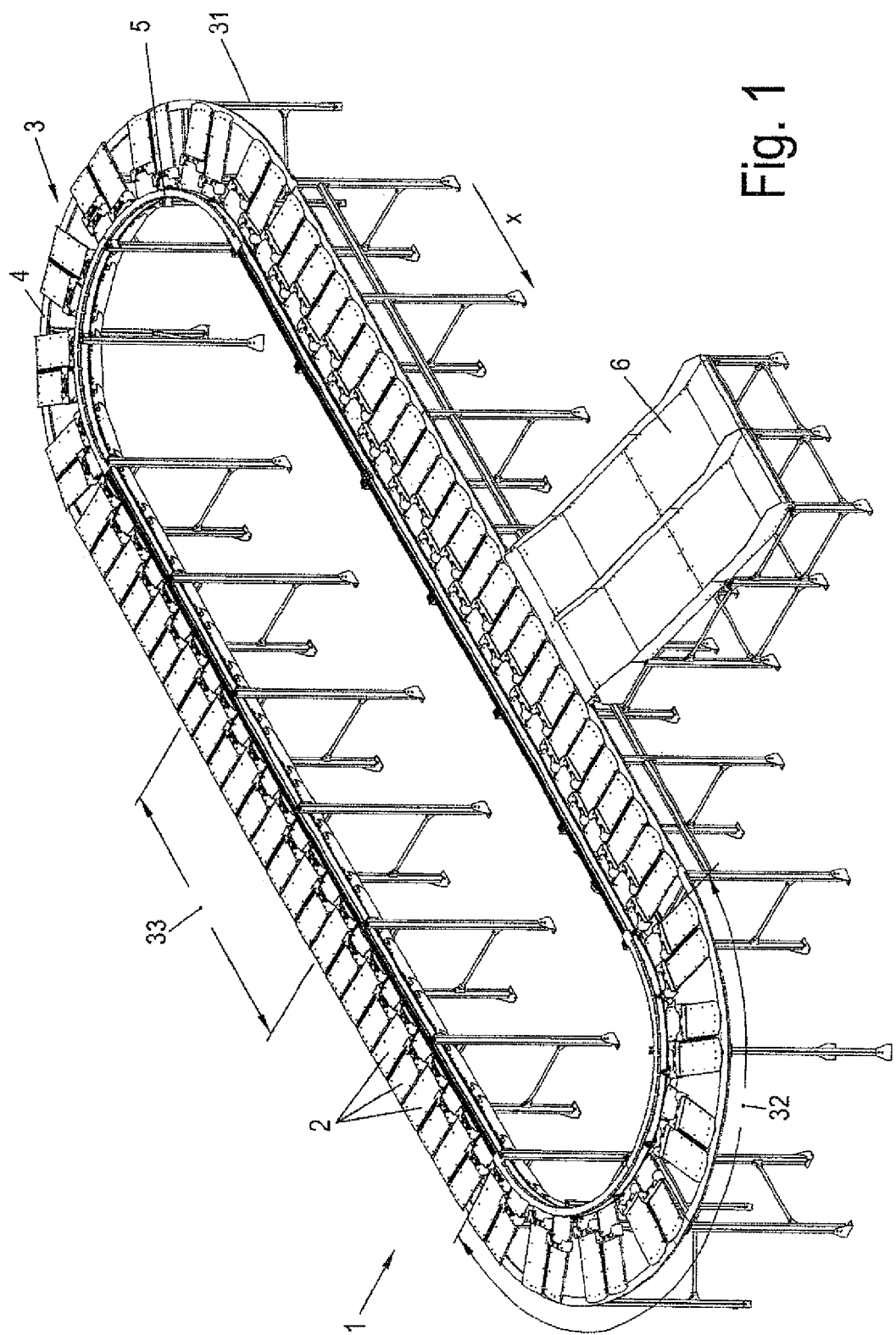

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the following description of the Figures, terms such as top, bottom, left, right, front, rear etc. exclusively relate to the exemplary representation and position of the conveyor selected in the Figures of the conveyor, the deposit table, the coupling element, the rail track, the webs and the like. These terms are not to be understood in a limiting manner, i.e., these relationships may change as a result of different operating positions or the mirror symmetrical configuration or the like.

Turning now to the drawing, and in particular to FIG. 1, there is shown an embodiment of a conveyor according to the invention overall designated with reference numeral 1. The conveyor 1 has a plurality of deposit tables 2, onto which objects that are to be transported are placed at a here not shown loading station.

The deposit tables 2 are movable along a rail arrangement 3 with a first rail track 4 and a second rail track 5 arranged parallel to the first rail track. The first rail track 4, which in this case is configured as outer track, and the second rail track 5, which is configured as inner track, are mounted on a frame 31. The first rail track 4 is formed substantially by a rail strip 41 with a support surface on which rollers 24, which are arranged on the bottom side 23 of the deposit tables 2, shown in FIGS. 3 and 7, rest.

The second rail track 5 is substantially formed by a rail section 51 with multiple tracks 52 for receiving running wheels 732 or guide wheels 731, 733 of a coupling element 7, which can be moved in the second rail track 5 via these running wheels 732 and guide wheels 731, 733.

The coupling element 7 shown in FIGS. 2, 3, 4 and 8 hereby serves for fastening the deposit tables 2 and with this for connecting the deposit tables 2 with the second rail track 5. As can be well seen in FIGS. 2-4, at least two of the deposit tables 2 are fastened in each of the coupling elements 7. A fastening of for example three or more deposit tables 2, which are suited for transport of a corresponding number of objects, is also conceivable. It is important not to configure. the length of the coupling element 7 too great so as to not impede the movement through curves.

Each of the deposit tables 2 has a pusher 22 which can be moved transverse to the movement direction x of the deposit tables 2, and with which the objects to be transported can be pushed from the deposit table 2.

As can be seen in FIG. 24, the pushers 22 are guided in outer edges of the deposit tables 2, which outer edges extend perpendicular to the transport direction x, and are moved from a position close to the second rail track 5 to a position close to the first rail track 4 via a guide wheel 25, which is arranged on the pusher 22 below the support surface of the deposit tables 2 and in the region of the unloading station 6 is guided in a further guide rail (not shown), which is arranged on the rail arrangement 3.

For guiding the pusher 2 along the respective deposit table 2, respective guide rails are fastened on the bottom side of the deposit table 2, along which guide rails the pusher 22 can be moved transverse to the movement direction x of the deposit tables 2.

The coupling elements 7, on which the deposit tables are fastened, have a holding part 71, which is movably held on the second rail track 5, preferably in the form of a tubular profile or rectangular profile.

On a in transport direction x rear end of each of the holding parts 71 a guide element 73 is fastened, which extends into the hollow section of the second rail track 5.

This guide element 73 substantially consists of a holding body with the above mentioned running wheels 732 and guide wheels 731, 733 fastened thereon, which are guided in the respective tracks of the hollow profile of the second rail track 5.

The deposit tables 2 are preferably fastened elastically with the respective holding part 71 of he coupling element 7. For this, elastically deformable connecting elements 9 are provided via each of which two of the deposit tables 2 are elastically connected with one of the coupling elements 7.

Figure 9:
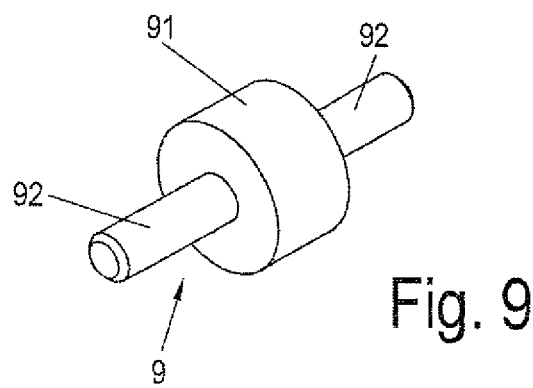

A preferred embodiment of such a connecting element 9 is shown in FIG. 9. The connecting element 9 is formed by a cushion 91, which is made of an elastic material such as rubber, and preferably is configured cylindrical, on which on both base surfaces respective bolts 92 are held which are held in respective bores 74 of eh deposit tables 2 and the coupling elements 7.

In the mounted state, the base surfaces of the cushion 91 rest against the side surfaces of the holding element 71 and a front-side edge of the deposit tables 2, so that the deposit tables 2 are pivotal perpendicular to the transport direction x of the deposit tables 2 if needed. This makes it possible that the deposit tables 2 are guidable on the respective coupling element 7 in the region of curve sections 7 of the conveyor 1 so as to be tilted toward the inside of the curve, and are guided horizontally in the region of a straight section 33 of the transport path of the rail arrangement 3.

As an alternative to the elastic fastening of the deposit tables 2 with the respective holding part 71 of the coupling element 7 or in addition, the tilt of the deposit tables 2 in the region of curve portions 32 of the conveyor 1 is enabled by the design of the guide element 73.

Figure 10A:
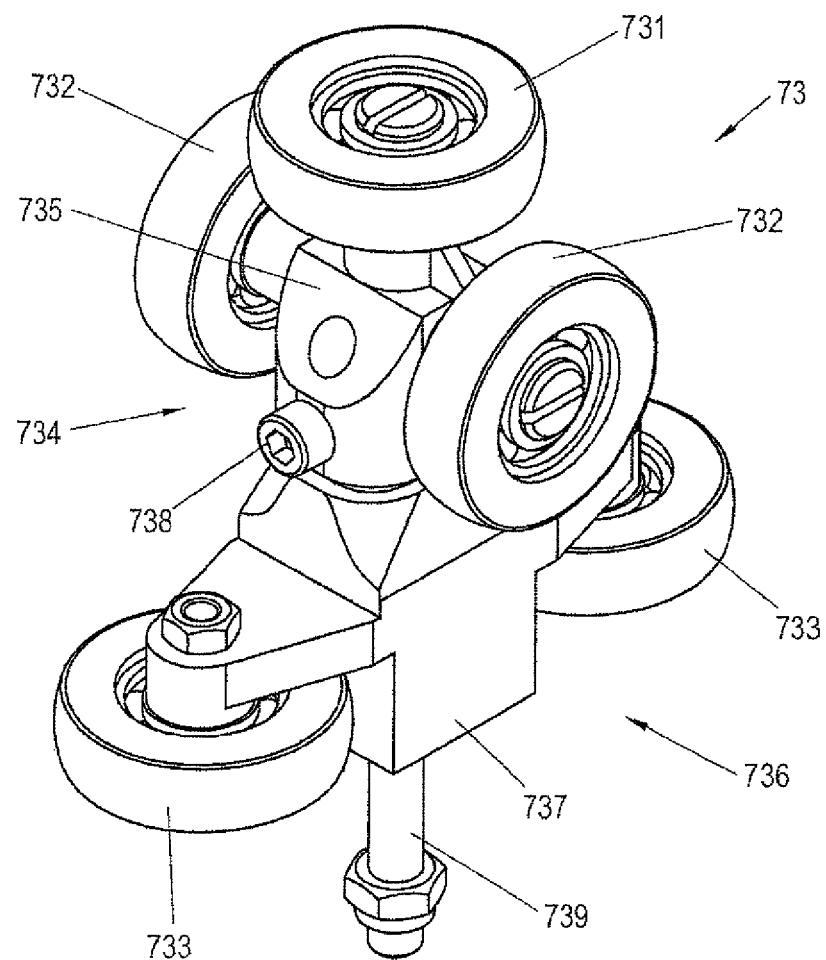
Figure 10B:
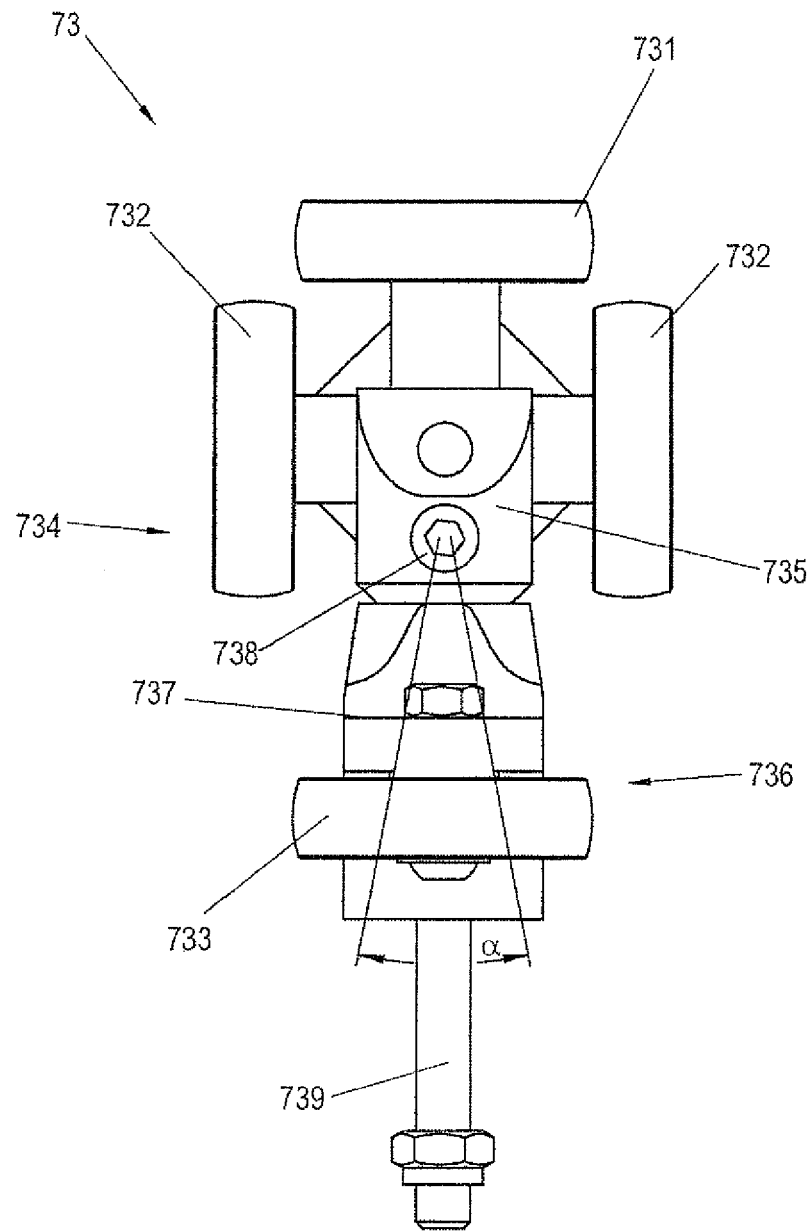

Hereby according to an embodiment shown in FIGS. 10a and 10b, the guide element 73 is configured so that a head part 734 of the guide element 73, consisting of the running wheels 732 and the guide wheels 731, which are rotatably supported on a first bearing housing 735, can be tilted relative to the foot part 736 about a tilt axis oriented in running direction of the coupling element 7 by an angle α of preferably 5 to 15.

The foot part 736 in this case essentially consists of a second bearing housing 737, the guide wheels 733 which are rotatably supported on the second bearing housing 737, and guide bolts 739, which extend downward from a bottom side which faces away from the head part 734, with the head part 71 being fastened on the on the bolts.

The guide bolt 739 is hereby held rotatively fixed in the second bearing housing 737 but axially displaceable, and is held in the first bearing housing 735 on a bolt 738, which is oriented in running direction of the coupling element 7. As a result the first bearing housing 735 can be pivoted relative to the second bearing housing 737.

Also in this embodiment the deposit tables 2 can be pivoted perpendicular to the transport direction x of the deposit tables 2, due to the pivotability of the guide elements 73.

This makes it possible that the deposit tables 2 can be guided on the respective pivoted coupling element 7 toward the inside of the curve in the region of curve sections 32 of the conveyor 1, and are guided horizontally in the region of a straight region 33 of the transport path of the rail arrangement 3.

The guide element 83 of the spacer element 8 is preferably configured so as to correspond to the above-described guide element 73 of the coupling element 7.

The deposit tables 2 can also be fastened to the respective holding part 71 of the coupling element 7 via a rigid connection, for example by screwing.

For driving the deposit tables 2, a friction-rolling drive is preferably used. For this each of the coupling elements 7 has pressing surfaces 721, 722 against which the electrically driven friction rollers can be pressed for driving the coupling elements 7.

These pressing surfaces 721, 722 are preferably formed by webs 72, which are fastened or molded below the holding part 71. The webs 72, which are for example configured as sheet metal, extend vertically and parallel to the transport direction x of the deposit tables 2.

Figure 3:
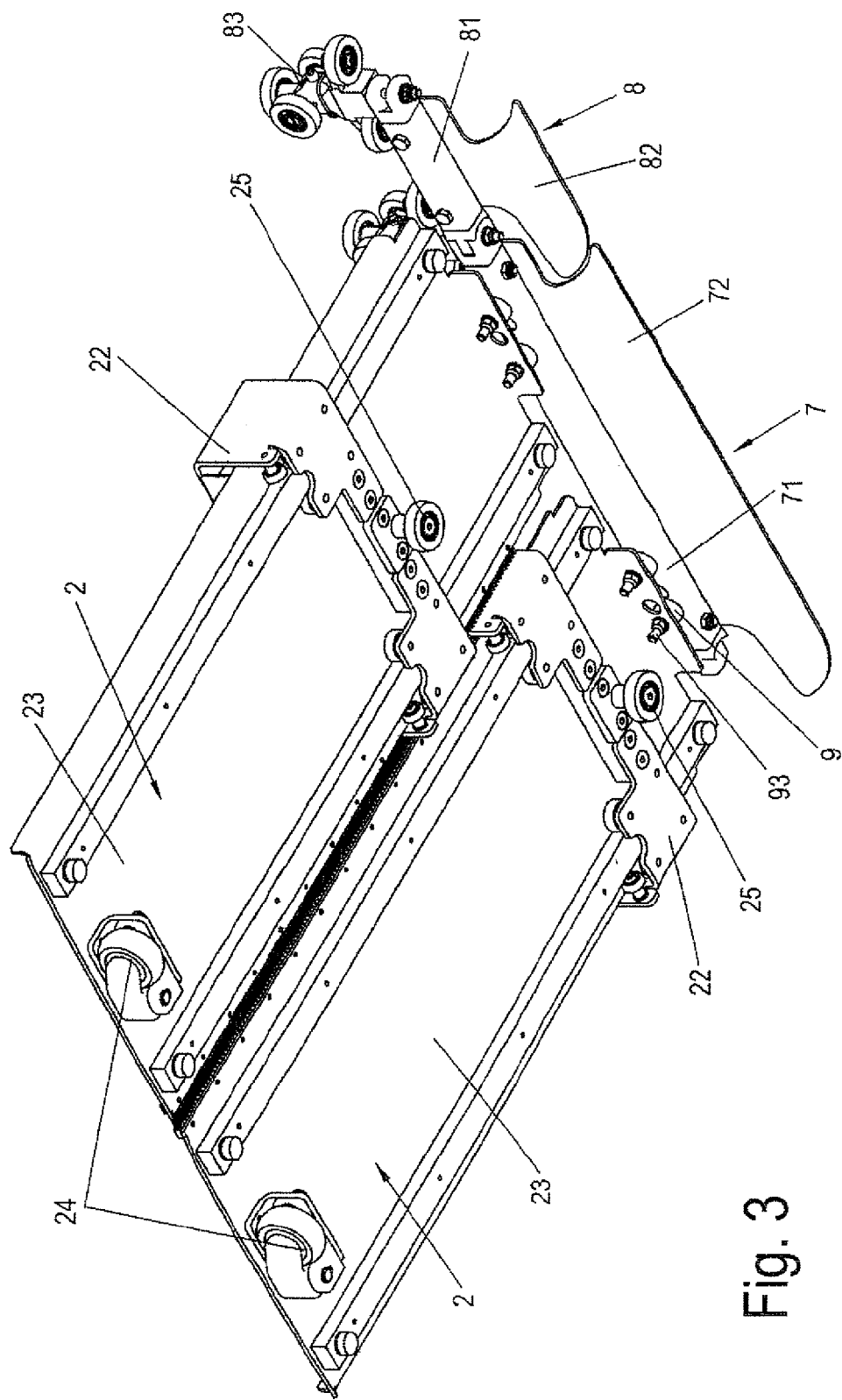

As can for example be well seen in FIG. 3, the front and the rear end edge of the webs 72 of neighboring coupling elements 7 engage in each other so as to be pivotal relative to each other horizontally and perpendicular to the transport direction x.

Figure 2:
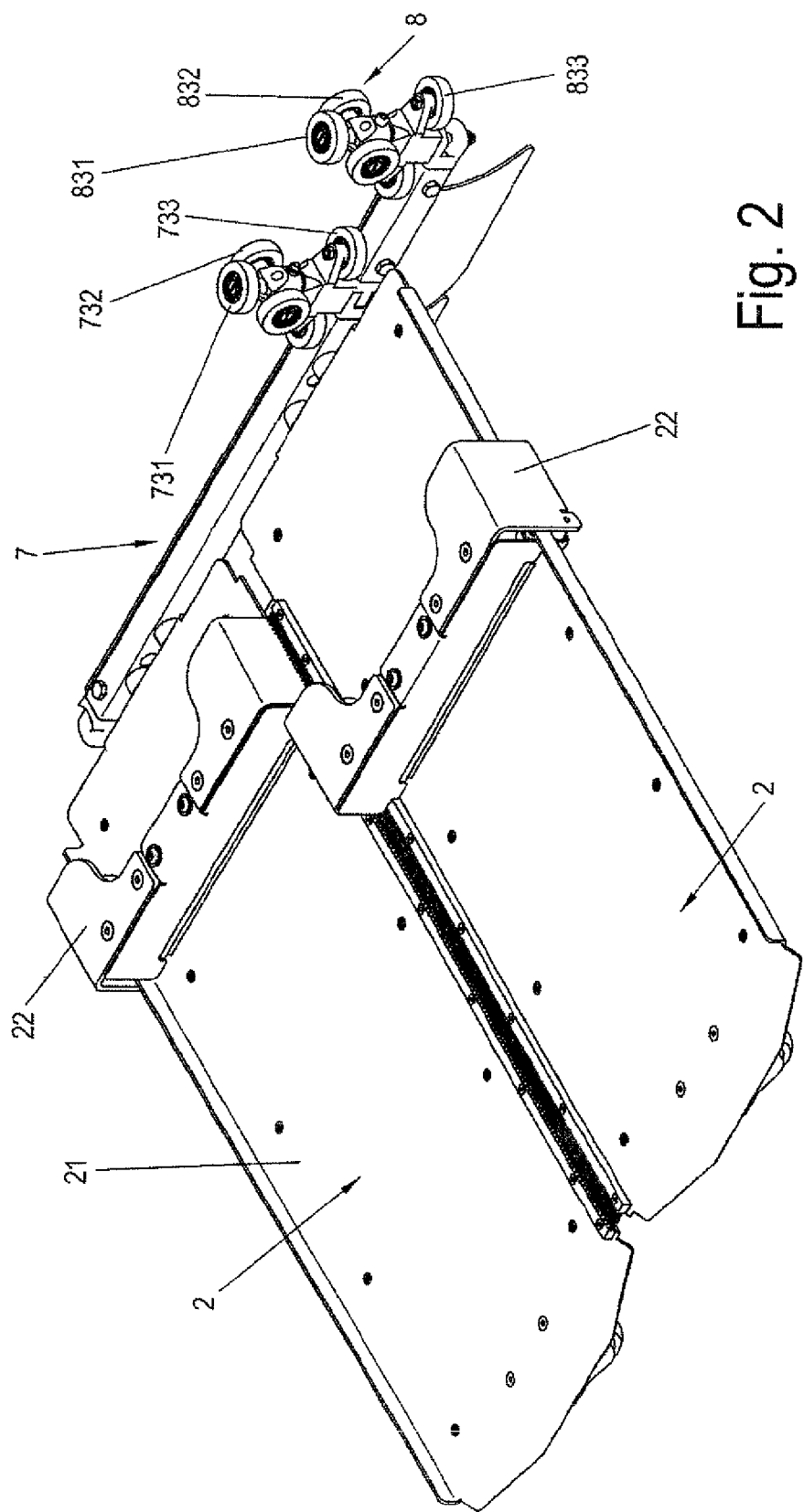
Figure 4:
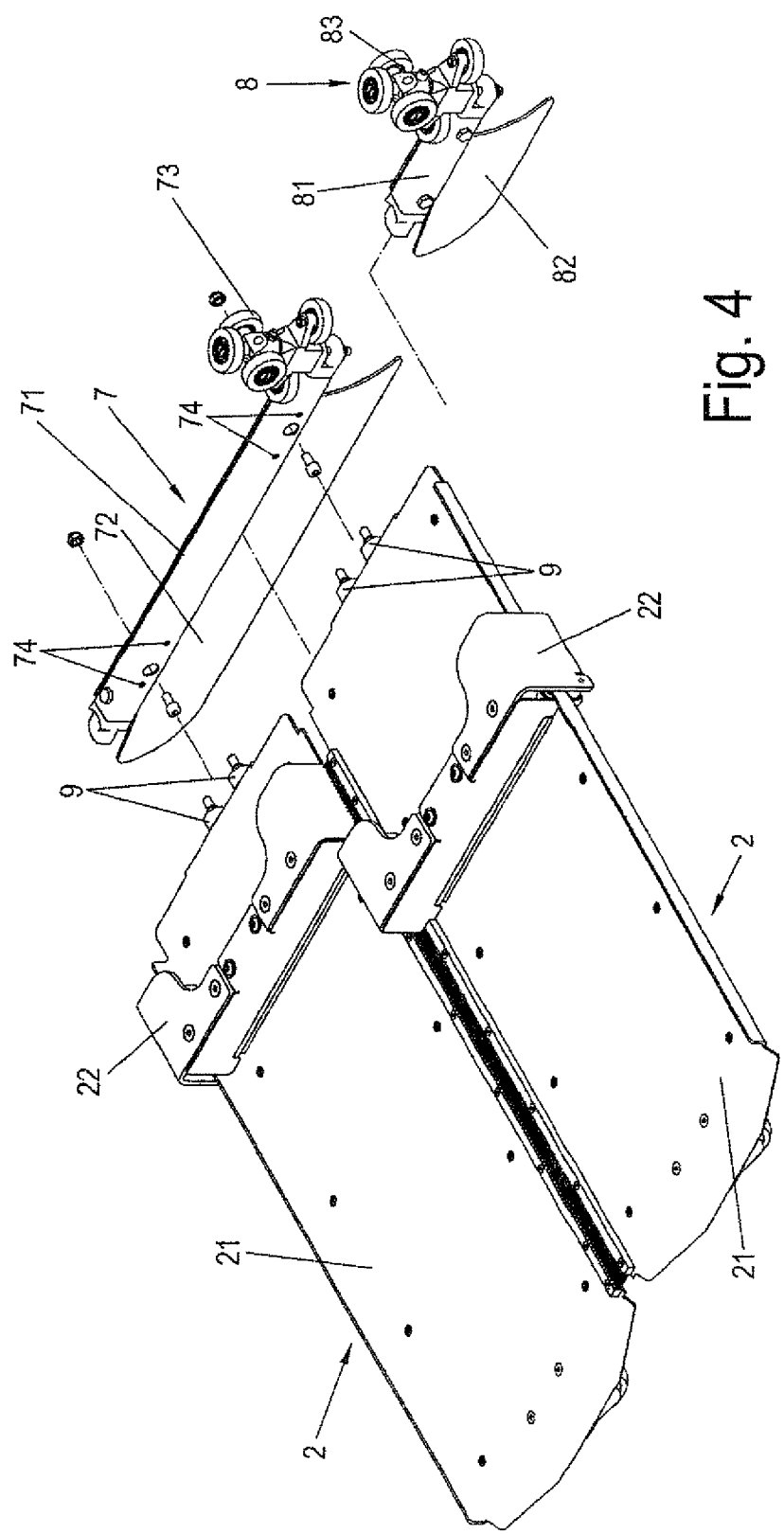

As shown in FIGS. 2-4, at least one respective spacer element 8 is arranged in the second rail track 5 for spacing neighboring coupling elements 7 with deposit tables 2 fastened thereon.

The construction of this spacer element 8, on which no deposit tables are fastened, corresponds substantially to the construction of the coupling elements 7, with a preferably tubular holding part 81, on which the guide element 83 with guide and running tracks and a vertically downward extending web 82 with respective pressing surfaces, on which the friction rollers of the friction roller drive (not shown) can engage.

Figure 7:
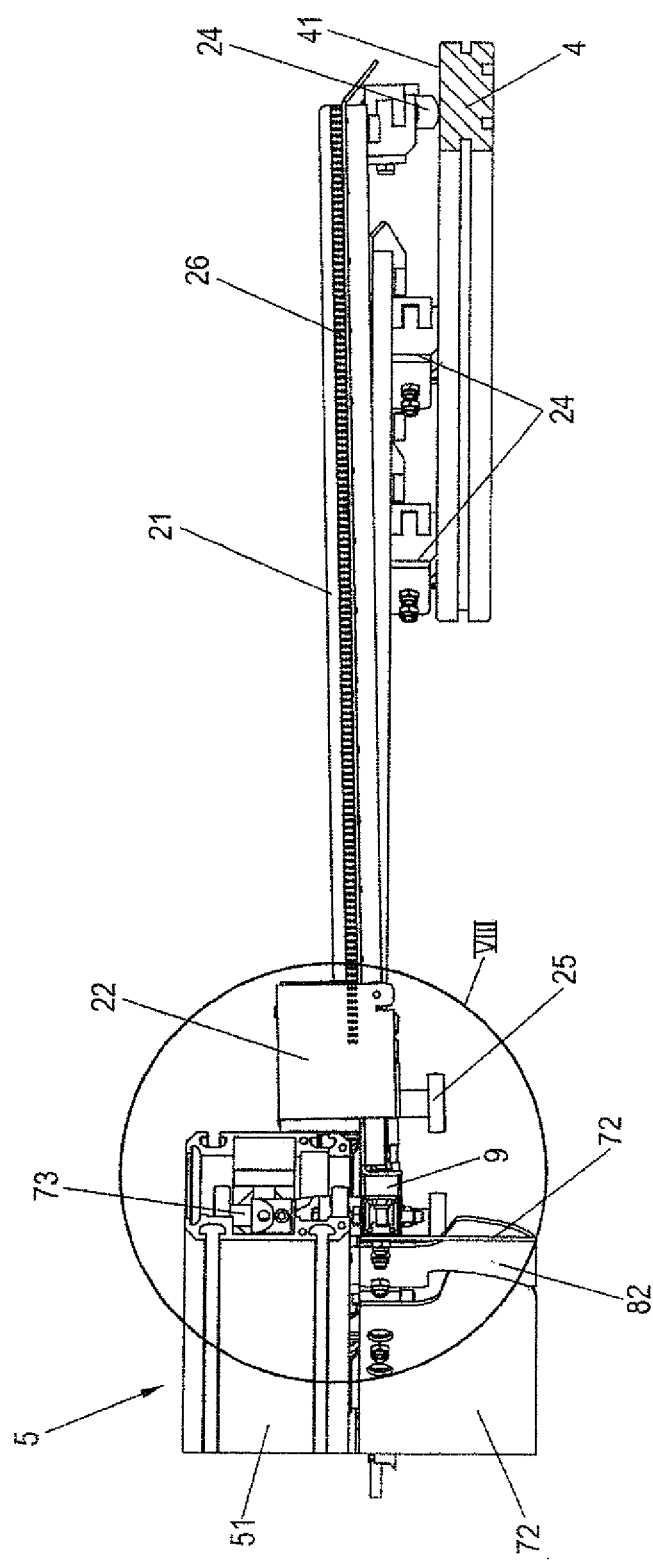

In order to guide the deposit tables 2 in the region of a curve 32 of the rail arrangement 3 tilted toward the inside of the curve on the respective coupling element, in a preferred embodiment the support surface 41 of the first rail track 4 is configured elevated relative to a straight region 33 of the transport path as shown in FIG. 7. Instead of the elevation of the first rail track 4, a lowering of the second rail track 5 is also conceivable.

Figure 8:
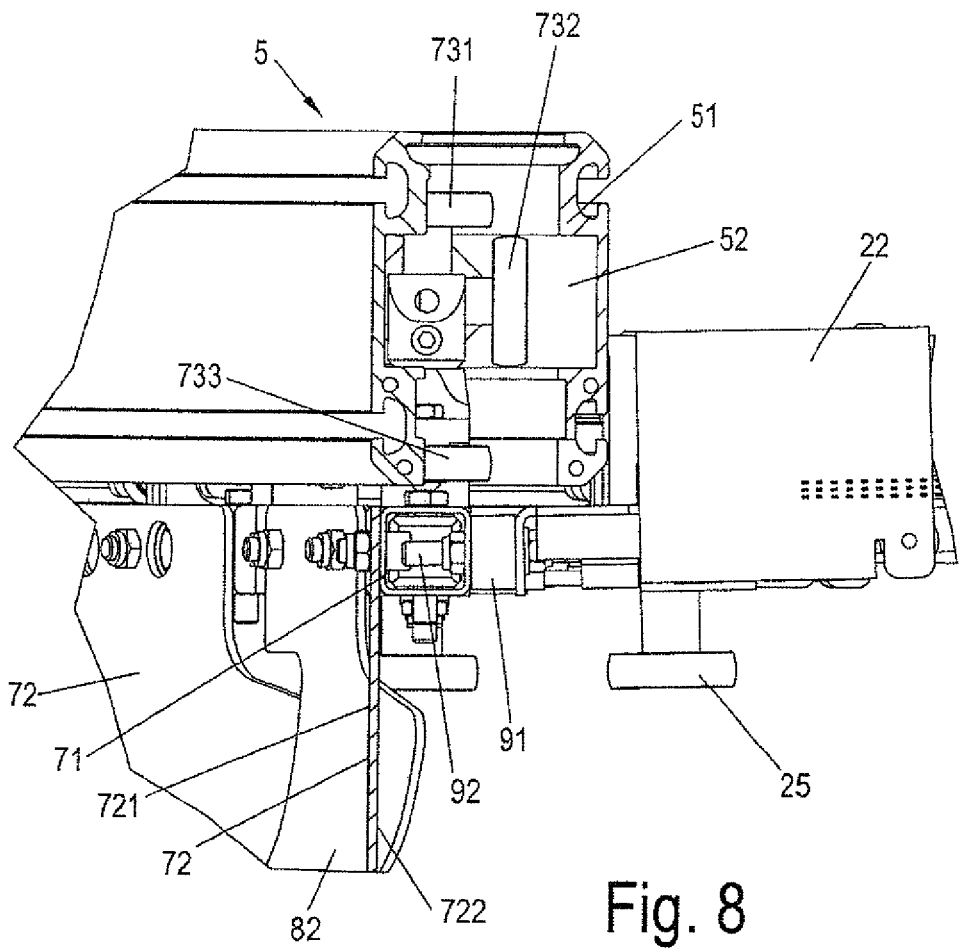

FIGS. 7 and 8 also illustrate well the tilt of the deposit table 2, enabled by the elastic support of the deposit table 2 on the holding part 71 by means of the elastic bolt 92.

Figure 5:
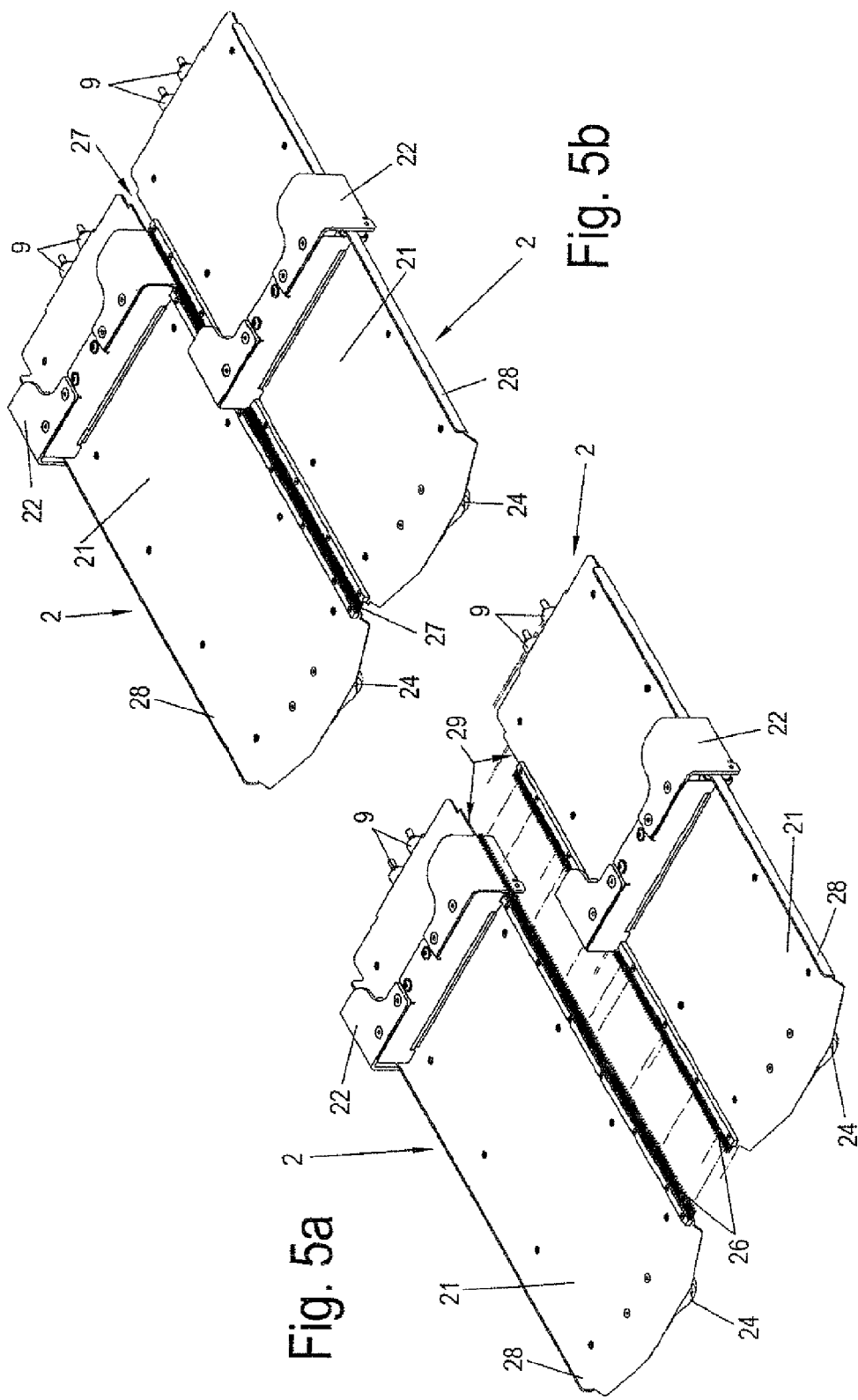
Figure 6:
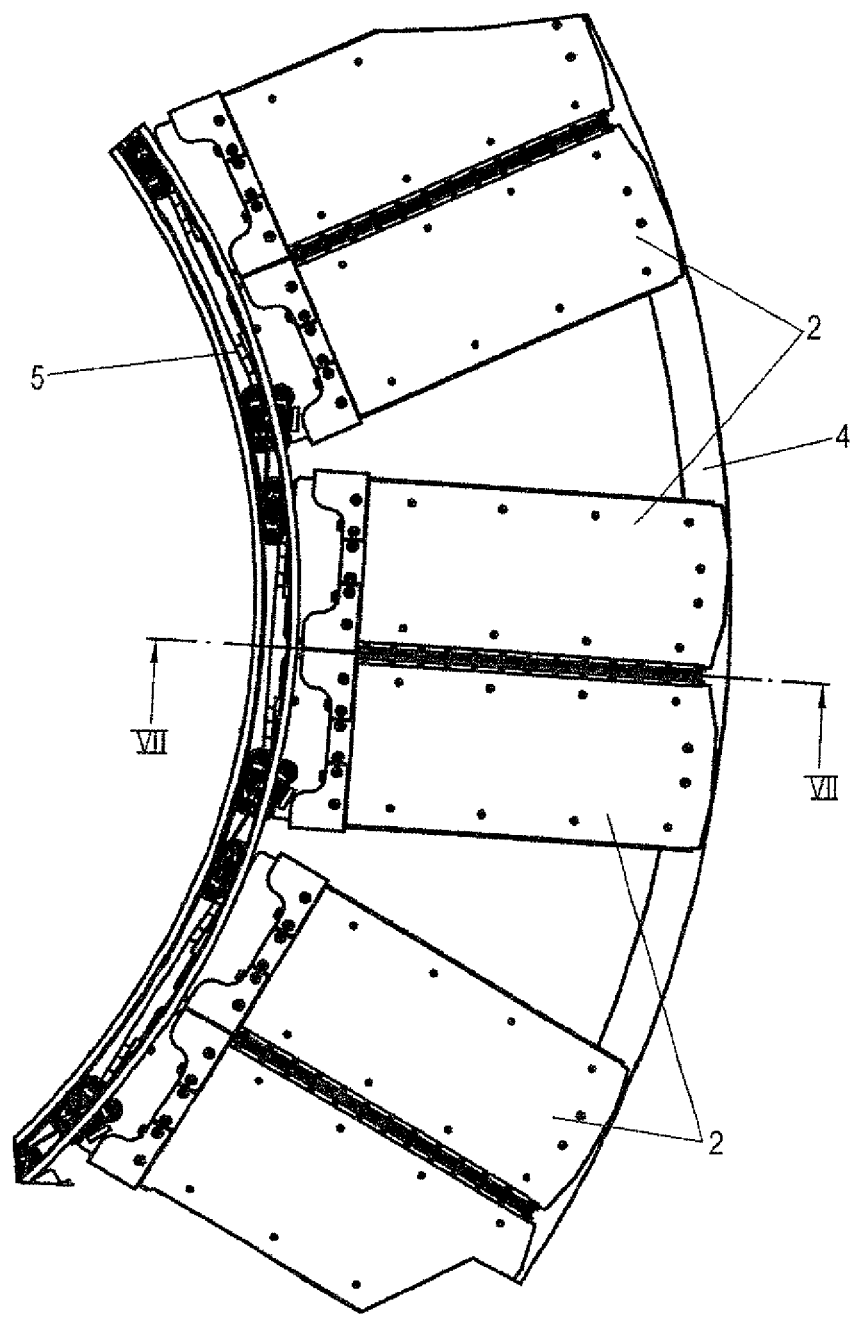

As shown in FIGS. 5a and 5b, a protective cover 26 is arranged in a gap 27 between neighboring wheels 29 of two deposit tables 2, which are fastened on one of the coupling elements 7, by means of which protective cover the gap is at least partially covered. The protective cover 26, which is particularly preferably configured as a brush, is fastened in the here shown exemplary embodiment on each of the neighboring wheels 29 of the deposit tables 2, wherein the bristles of the protective cover 26, which is configured as brush, in the assembled state (shown ion FIG. 5b) engage in each other and thereby prevent an object placed on the support surface 21 of the deposit tables 2 from slipping through this gap 27.

In the here shown embodiment the protective cover 26 is placed on the support surface 21 of the deposit tables 2 and thus additionally serves for preventing objects placed on the respective support surfaces 21 from a sliding off.

For preventing the objects from sliding off via the outer borders 28 of two deposit tables 2 fastened on one coupling element 7, which borders extend perpendicularly to the transport direction x, these outer borders 28 are preferably bent upwards, as for example shown in FIG. 4.

While the invention has been, illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A conveyor for transporting objects, comprising:
   a rail arrangement comprising a first rail track and a second rail track extending parallel to the first rail track;
   coupling elements guided in the second rail track and drivable with a drive device along the second rail track; and plural deposit tables for receiving the objects thereon, with at least two of said deposit tables being fastened on each of the coupling elements and slidingly or rollingly supported on the first rail track, each of said deposit tables having a pusher which is movable transversely to a transport direction of the deposit tables for pushing the objects off the deposit tables.

2. The conveyor of claim 1, wherein each of the coupling elements has a holding element, which is movably supported on the second rail track, and on which the at least two deposit tables are fastened.

3. The conveyor of claim 1, wherein the deposit tables are fastened elastically on the respective coupling element.

4. The conveyor of claim 3, wherein the coupling elements and the deposit tables are connected with each other via elastically deformable connecting elements.

5. The conveyor of claim 4, wherein the connecting elements have two bolts which are connected with each other by a cushion made of an elastic material, said bolts being held in respective bores of the deposit tables and the coupling elements.

6. The conveyor of claim 1, wherein each of the coupling elements has pressing surfaces against which electrically driven friction rollers are pressable for driving the coupling elements.

7. The conveyor of claim 6, wherein the pressing surfaces are formed on webs which are fastened or molded below the holding part, wherein the pressing surfaces extend vertically and parallel to the transport direction.

8. The conveyor of claim 7, wherein the webs each have a front and rear end edge with regard to the transport direction, and wherein the front end edge and the rear end edge of the webs of respective neighboring coupling elements engage with each other so as to be pivotal relative to each other about a rotation axis which is oriented horizontally and perpendicularly relative to the transport direction.

9. The conveyor of claim 1, wherein the deposit tables in a straight region of a transport path of the rail arrangement are guided horizontally and in a region of a curve of the rail arrangement are guided on the respective coupling element tilted toward an inside of the curve.

10. The conveyor of claim 1, wherein the first rail track in the region of a curve of the rail arrangement is configured as outer track having a greater curvature radius than a curvature radius of the second rail track, which is configured as inner track, and a support surface of the first rail track is elevated in the region of the curve relative to a straight region of a transport path of the rail arrangement.

11. The conveyor of claim 1, wherein a gap between neighboring borders of two of the deposit tables which are fastened on one of the coupling elements is at least partially covered by a protective cover arranged on one of the borders.

12. The conveyor according to claim 11, wherein the protective cover is configured as a brush.

13. The conveyor of claim 1, wherein between neighboring ones of the coupling elements with deposit tables fastened thereon at least one respective spacer element is arranged in the second rail track.

14. The conveyor of claim 1, wherein each of the coupling elements has at least one guide element with running wheels and guide wheels respectively guided in respective tracks of a hollow section of the second rail track.

15. The conveyor of claim 14, wherein the guide element has a head part formed by a first bearing housing, on which the running wheels and guide wheels are rotatably supported, and a foot part arranged on the head part so as to be pivotal by a defined angle, said foot part having a second bearing housing on which the guide wheels are rotatably supported and from which a guide bolt extends downwardly from a side which faces away from the head part, said head part being fastened on the guide bolt.

\* \* \* \* \*